United States Patent [19]

Klann

[11] 3,967,898

[45] July 6, 1976

[54] OPTICAL DISTORTION DEVICE

[76] Inventor: Paul A. Klann, P.O. Box 2398, Waynesboro, Va. 22981

[22] Filed: Nov. 14, 1974

[21] Appl. No.: 523,947

[52] U.S. Cl. .................................. 355/110; 355/52
[51] Int. Cl.² .................................... G03B 27/10
[58] Field of Search ................ 355/52, 84, 108, 110

[56] References Cited
UNITED STATES PATENTS

| | | | |
|---|---|---|---|
| 2,037,764 | 4/1936 | Daneker | 355/125 |
| 3,401,616 | 9/1968 | Cross | 355/84 |
| 3,427,105 | 2/1969 | Ingalls | 355/52 |
| 3,445,165 | 5/1969 | Dubbs | 355/84 |
| 3,687,545 | 8/1972 | Moorhusen | 355/51 |

Primary Examiner—L. T. Hix
Assistant Examiner—E. M. O'Connor
Attorney, Agent, or Firm—Sughrue, Rothwell, Mion, Zinn & Macpeak

[57] ABSTRACT

The optical distortion device which can make a contact copy of a photographic film image with one dimension of the copy lengthened or shortened while the perpendicular dimension is unchanged is comprised of a pair of cylindrical motor driven rollers, at least one of which can be driven at a variable speed. The axes of the rollers are disposed parallel to each other and to a narrow slit through which a beam of light is directed. A photographic image and a sheet of photosensitive material are disposed in superimposed relation with one edge of each secured to a respective roller so that upon rotation of the rollers the photographic image and the photosensitive sheet will be simultaneously moved over the light slit. By varying the speed of one motor so that its rate of rotation will be greater than, equal to or less than the rate of rotation of the other roller the dimension of the image in the direction of movement can be made greater than, equal to or less than the dimension of the original in the direction of movement.

7 Claims, 6 Drawing Figures

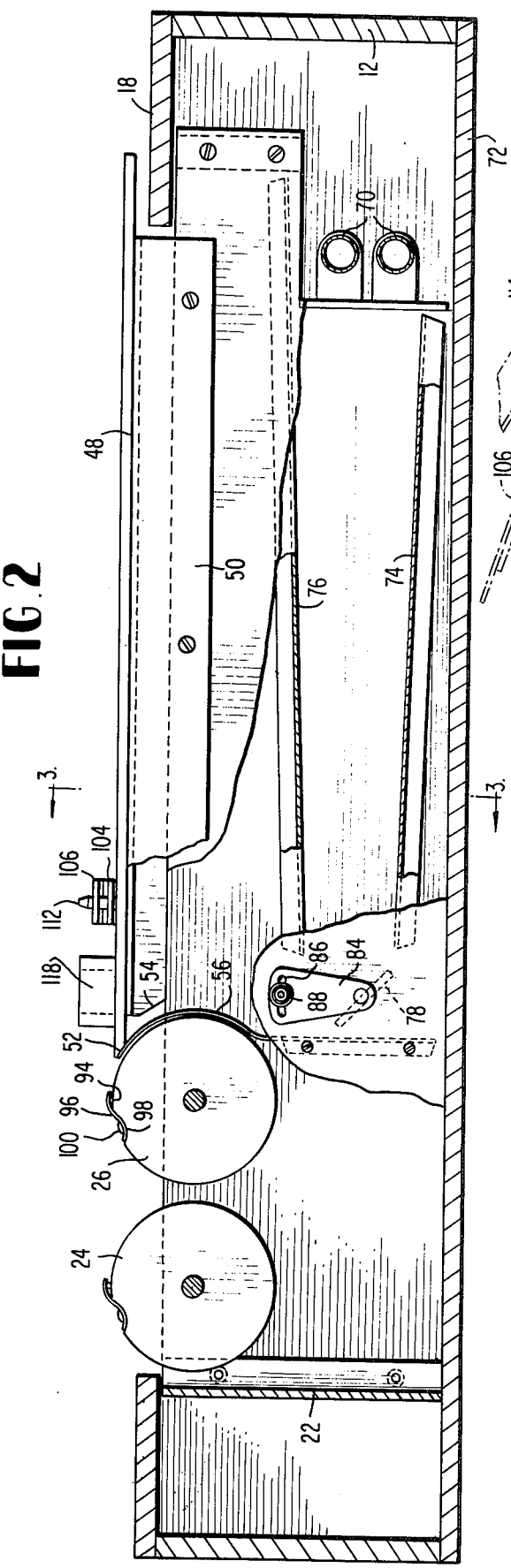
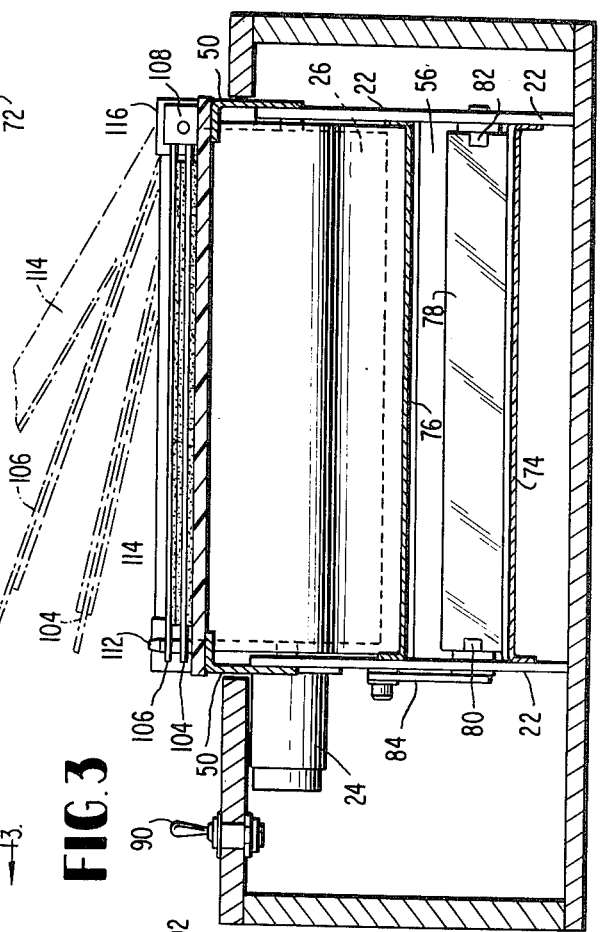
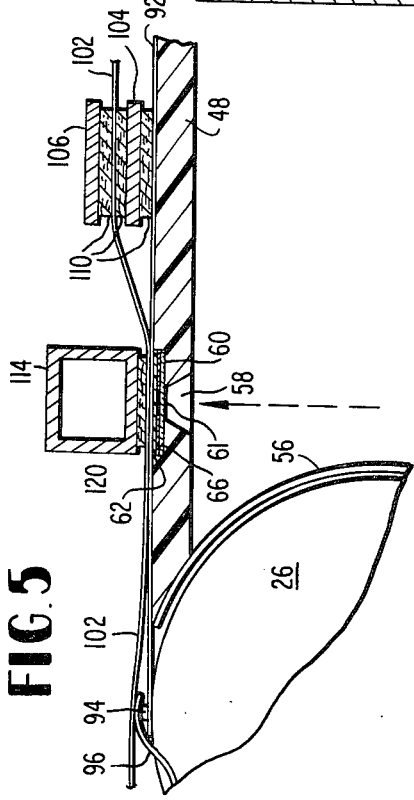
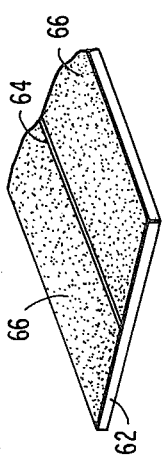

OPTICAL DISTORTION DEVICE

BACKGROUND OF THE INVENTION

1. Field of the Invention

The present invention is directed to an optical distortion device and more specifically to a mechanical apparatus for making a contact copy of a photographic film image with one dimension of the copy lengthened or shortened while the perpendicular dimension is unchanged.

2. Prior Art

Optical or photographic distortion devices are old and well known in the art and perhaps the best known of these involved the use of an anamorphic lens, that is a lens which has a different magnification of the image in each of two perpendicular directions. The cost of such lenses is prohibitive for many small businesses and they do not provide any flexibilities whatsoever. A different lens is required for each and every variation desired in the distortion process.

Other prior art photograhic distortion devices mount the negative and the photosensitive sheet in a pair of frames which are supported for rectilinear movement within an enclosure past a light slit. Most of these devices utilize an extremely complex linkage for obtaining the differential rate of movement between the two frames as they pass over the light slit.

Still another prior art arrangement utilizes a belt for moving a photosensitive sheet over the surface of a table by a pully arrangement. A conventional vairably transparent positive is positioned stationarily and planarily adjacent the photosensitive sheet between the sheet and a movable light housing. However, such an arrangement is extremely bulky and mechanically complex.

SUMMARY OF THE INVENTION

The present invention provides an optical distortion device which is extremely simple in construction as well as being flexible and economical in operation.

The present invention provides a unidirectional photographic distortion apparatus wherein a pair of motors, one of which is of the variable speed type, simultaneously pull a photographic image and a photosensitive sheet past a light slit in superimposed relation.

The present invention provides a unidirectional photographic distortion apparatus for producing photographic prints wherein the amount of distortion is constant while in the full length of the prints produced.

The present invention provides the unidirectional photographic distortion device in which the amount of distortion desired in the prints of a photographic image can be easily preset with a high degree of accuracy before the exposure cycle is initiated.

The present invention provides a photographic distortion device wherein a predetermined amount of distortion in one dimension is produced in a photographic reproduction by the relative motion of a film image sheet and a superimposed photosensitive material sheet across a light slit by maintaining the rate of travel for one of said sheets constant for all degrees of distortion desired and varying the rate of travel of the other sheet depending upon the amount of distortion being produced.

The present invention provides a unique light slit for the photographic distortion device which is in the form of a photographic image having a transparent line thereacross so that the width of the light slit can be varied by merely substituting one photographic image of a line for another.

The present invention provides a photographic distortion device which is comprised of a box having a hinged cover and which is provided with a light source completely enclosed therein except for a variable width narrow slit in the upper surface thereon, a pair of drums mounted for rotation within the box with their axes parallel to the longitudinal dimension of the slit, variable speed synchronous motor means for driving said drums, means for securing a photographic image to the drum close to the light slit with the negative overlying the upper surface of the light enclosure having the slit therein and means for attaching a photosensitive sheet to the other drum with the photosensitive sheet disposed in overlying relation with respect to the negative where it passes over said light slit.

Other objects, advantages and teachings of the present invention will become apparent from the following detailed description presented in conjunction with the accompanying drawings.

BRIEF DESCRIPTION OF THE DRAWINGS

FIG. 2 is a longitudinal sectional view with the parts thereof broken away of the photographic distortion device shown in FIG. 1.

FIG. 3 is a transverse sectional view taken along the line 3-3 of FIG. 2.

FIG. 5 is a detailed partial sectional view taken in the direction of travel of the sheets showing the relationship of the sheets hold down devices, the light slit and one of the rollers.

FIG. 6 is a detailed partial perspective view of the line type photographic image for providing the light slit.

DETAILED DESCRIPTION OF THE INVENTION

Figure 1:
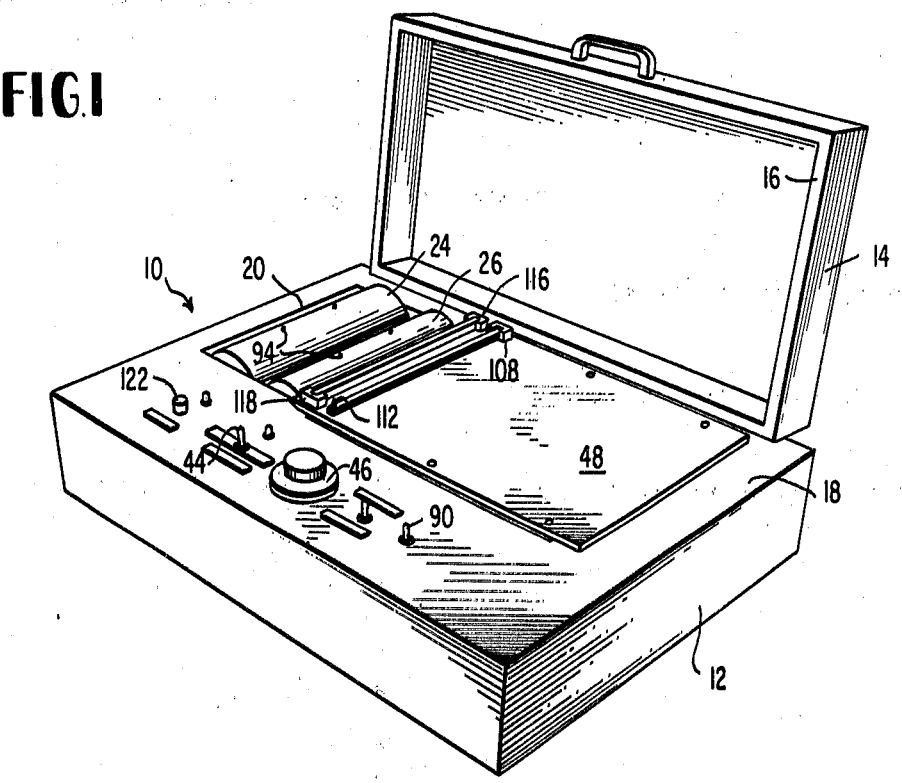
FIG. 1 is a perspective view of the photographic distortion device according to the present invention.
Figure 4:
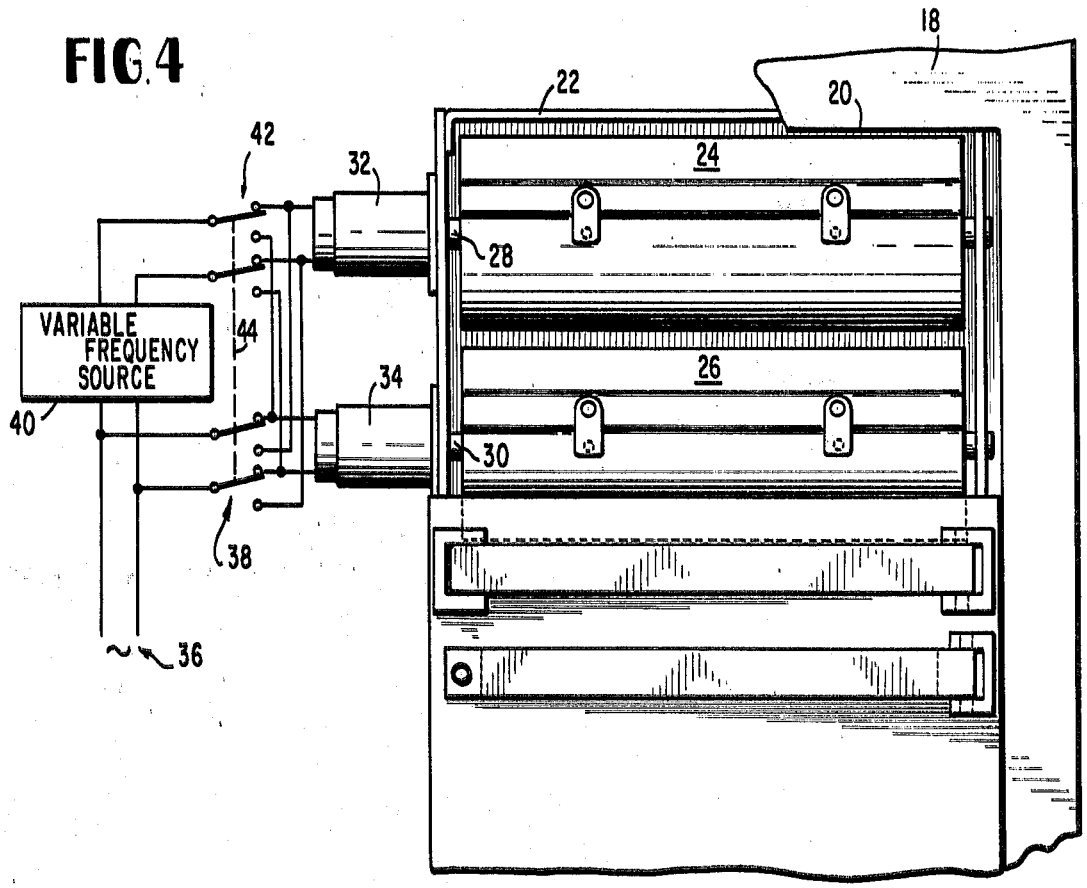
FIG. 4 is a partial top plan view of the photographic distortion device shown in FIG. 1 including a schematic wiring diagram for the motors.

The photographic distortion device 10 as shown in FIG. 1 is comprised of a rectilinear box 12 having a cover 14 hinged thereto. Suitable sealing means 16 may be provided on the edges of the cover to provide a light proof engagement with the upper surface 18 of the box 12 when the cover is closed. However, the photographic distortion device could be operated with the cover open provided the operation takes place in a dark room. The upper surface 18 of the box 12 is provided with a rectilinear aperture 20 which would be completely enclosed by the cover 14 in the closed position. A frame 22 as best shown in FIGS. 2, 3 and 4 is mounted within the box in general alignment with the opening 20. A pair of cylindrical rollers 24 and 26 are rotatably mounted within the frame 22 in closely spaced apart parallel relation. The spindles 28 and 30 of the rollers 24 and 26, respectively, extend through the frame 22 and are driven by a pair of variable speed synchronous motors 32 and 34, respectively. As shown in FIG. 4, the 60 cycle voltage from a suitable source 36 can be applied directly to either motor by means of the switch 38. The 60 cycle voltage is also applied directly to a variable frequency source 40 and the variable frequency voltage output can be applied to either motor by means of switch 42. The two switches 38, 42 are arranged for conjoint movement by any suitable means such as a mechanical link 44 shown in dotted lines so that one motor will always be connected to run at a constant speed and the other motor will be connected to run at any one of a plurality of speeds depending upon the setting of the dial 46 which operates the variable frequency source 40. The details of the variable frequency source have not been shown since such means for varying the frequency are old and well known in the art.

A work supporting plate 48 is supported on the frame 22 by plates 50 so that the upper surface of the work support plate is substantially tangential to the cylindrical rollers. The support plate 48 covers the remaining portion of the aperture 20 with the edge portions thereof overlying the upper surface 18 of the box 12. The edge 52 of the work support plate 48 and the edges 54 of the underlying support plates 50 are rounded and beveled, respectively, to enable them to be disposed in close proximity to the roller 26. A light baffle 56 extends transversely of the frame 22 and is secured thereto. The upper portion of the light baffle 56 is provided with a cylindrical contour which is closely spaced from the cylinder 26 and disposed in contact with the edge 52 in a light tight manner. The work support plate 48 may be formed of any suitable opaque material such as plastic or the like and is provided with an elongated slot 58 extending substantially across the entire width thereof in open communication with a recess 60 which is wider than the slot 58 but commensurate in length therewith. The slot 58 is provided with tapered sides so that the slot is narrower at the point where it enters into the recess 60. A glass plate 61 is fitted in the bottom of recess 60 and a strip of opaque photographic film 62 having the transparent image of a line 64 thereon is closely fitted within the recess 60 on plate 61 with the line image 64 centered on and extending the length of the slot 58. The film 62 is placed with the emulsion adjacent the glass plate 61 to protect the emulsion and the edges are sealed to prevent the entry of dust or the like. Thus the upper surface of the film 62 may be cleaned and there is no danger of the photographic emulsion being worn off the photographic film by the sliding passage of the copy supporting sheet thereover.

A pair of fluorescent light tubes 70 or a variable intensity incalescent light source are secured at one end of the frame 22 and extend substantially across the entire width thereof adjacent the bottom walls 72 of the box 12. A pair of angled light baffles 74 and 76 are mounted in the frame 22 and extended across the entire width thereof. The light baffles 74 and 76 are mounted below and above the light source 70 and converge toward each other from the light source in a direction of the light baffle 56. Disposed between the ends of the light baffles 74 and 76 and the light baffle 56 is a meter 78 or other suitable light reflecting strip which is rotatably mounted between the side walls of the frame 22 on pivots 80 and 82. The pivot pin 80 is connected to a lever 84 on the outside of the frame 22 for movement thereby and the lever 84 is provided with a curved slot 86 through which a clamping screw 88 extends into threaded engagement with the wall of the frame 22. The reflecting surface 78 is disposed and angled to reflect the light from the light source 70 upwardly through the slot 58 and the transparent line image 64. By loosening the clamping screw 88 the lever 86 may be tilted to adjust the angle at which the reflecting surface 78 is disposed to focus the light beam exactly on the line image 64. The width of the line image is approximately 0.008 – 0.012 inches and different width line images can readily be substituted primarily replacing the photographic film strip in the recess 60. By locating the light source 70 at the far end of the box from the light slit defined by the photographic line image and reflecting the light upwardly a substantially parallel beam of light is obtained. However, the type of light source and the exact location thereof could readily be varied. The switch 90 on the upper surface of the box 12 controls the light source 70.

A transparent carrier sheet 92 is adapted to be disposed in flat overlying relation with the upper surface of the work support plate 48. The carrier sheet 92 is provided with a pair of apertures at one end which are adapted to fit over the pins 94 which protrude from the surface of the roller 26. A pair of spring plates 96, only one of which is shown in FIGS. 2 and 5, are secured in a pair of recesses 98 which are circumferentially displaced from the pins 94 in the counterclockwise direction by rivets 100 or any other suitable means. The free end of the spring plates 96 are provided with apertures adapted to fit over the pins 94 to hold the carrier sheet on the pins 94.

A second transparent carrier sheet 102 is adapted to be disposed in overlying relation to the first carrier sheet 92 and is arranged for connection to the roller 24 in the exact same manner with the connection of the sheet 92 to the roller 26. A sheet of photosensitive material, not shown, may be secured to the carrier sheet 102 by any suitable temporary securement means such as adhesive tape or the like and the photographic image or other copy adapted to be reproduced in a distorted manner is adapted to be secured to the carrier sheet 92. The image sheet and the photosensitive sheet could be provided with perforations or any other suitable means for connecting them directly to the rollers 24 and 26 in which case the carrier sheets 92 and 102 could be dispensed with. When the carrier sheets are used it is preferrable that the photosensitive sheet be secured to the under surface of the carrier sheet 102 and the image sheet secured to the upper surface of the carrier sheet 92 so that they will be in direct face-to-face contact to provide a superior reproduction of the image. It is furthermore desirable to have the image sheet and the photosensitive sheet disposed in sliding contact with each other only in the immediate vicinity of the light slit to prevent undue rubbing of the two sheets together. In order to separate the sheets, a pair of spacer bars 104 and 106 are pivoted in superimposed relation in a support block 108 on the upper surface of the work support plate 48. Strips of felt 110 or any other suitable anti-marking or scratching material are secured to the under surface of the spacer bar 106 and the upper and lower surfaces of the spacer bar 104. Thus, the carrier strip 92 and the copy material secured thereto will move between the spacer bar 104 and the work support plate 48 and the carrier strip 102 and the photosensitive material secured thereto will move between the spacer bar 104 and 106. The free ends of the spacer bars 104 and 106 are provided with an aperture for the reception of a locating pin 112 which protrudes upwardly from the upper surface of the work support plate 48.

In order to maintain the image or copy sheet and the photosensitive sheet in intimate contact as they pass over the light slit a hollow rectilinear pressure bar 114 is pivotally mounted in a support bracket 116 adjacent one end of the slot 58. The free end of the pressure bar 114 is adapted to be retained and located in a C-shaped block 118 disposed at the opposite end of the slot 58. A strip of felt 120 or any other suitable anti-scratching material is secured to the under surface of the pressure bar 114. If the pressure bar 114 is not heavy enough to press the sheet into intimate contact additional weights can be disposed in the hollow interior thereof.

In the operation of the photographic distortion device as described above the copy or image to be distorted is secured to the transparent carrier sheet 92 by any suitable means such as adhesive tape or the like. A sheet of photosensitive material is generally aligned with the copy sheet and secured to the transparent carrier sheet 102. Generally the copy sheet and the photosensitive sheet are secured on the opposed paces of the carrier sheets 92 and 102 but they could be secured to other surfaces of the carrier sheet as well. Likewise, the copy sheet and the photosensitive sheet can be secured directly to the rollers 24 and 26. However, when using the carrier sheets 92 and 102 these sheets are placed over the pins 94 on the rollers and clamped thereto by the spring strips 96. If the carrier sheets and the copy and photosensitive sheets which are secured thereto are short enough the cover of the box can be closed and the operation carried out in a daylight environment. However, if exceptionally long copy is being used the device can be operated with the cover opened and in a darkened environment.

Assuming the variable frequency source 40 is of the type which is only able to reduce the frequency to cause the motor connected thereto to run at a slower speed than the motor which is connected directly to the 60 cycle voltage source it must be determined whether the image is to be stretched or shrunk in the direction of movement. If it is desired to stretch the image formed on the photosensitive sheet, it would be necessary to rotate the drum 24 faster than the drum 26 which controls the movement of the copy material. Therefore, to stretch the image the operator will move the switch linkage 44 to shift the switches 38 and 42 from the positions shown in FIG. 4 to the other contacts so that the motor 32 will be operated directly by the 60 cycle voltage. The knob 46 will then be rotated to determine exactly how much slower the roller 26 will operate than the roller 24. With the sheets 92 and 102 disposed relative to the spacer bars 104 and 106 and the presser bar 114 as shown in FIG. 5 the start button 122 is pressed to initiate the operation of the motors thereby causing the two sheets 92, 102 to be pulled pass the line image or light slit 64 at a predetermined differential rate to produce an image on the photosensitive material which is elongated in the direction of movement. The motors can be stopped either manually by the operator when the copy passes the light slit or a suitable limit which control means can be disposed in conjunction with the rollers to automatically shut off the motors and energize a pilot light to indicate the completion of the cycle. The adjustment of the angle of the light reflector 78 is generally a one time operation when the machine is initially sold. However, it may be necessary to make minor adjustments in the angle of the light reflector 78 if the photographic film having the light slit or the light source is changed in such a manner that the alignment will be slightly different.

To those skilled in the art to which this invention relates, many changes in construction slightly different embodiments and application of the invention will suggest themselves without departing from the spirit and scope of the invention. The disclosure and the description herein are purely illustrated and are not intended to be of any sense limiting.

What is claimed is:

1. A device for producing a print from a photographic image with a predetermined change in one dimension thereof comprising a fixed frame, light source means mounted in said frame, enclosure means surrounding said frame and having a flat upper surface provided with an elongated light aperture, first and second roller means rotatably mounted in said fixed frame with the axes of rotation thereof disposed parallel to each other and to said elongated light aperture, attaching means on said roller means to which an image sheet and a photosensitive sheet may be secured, drive means for rotating said first and second roller means at different speeds to drive said sheets in superimposed relation on said flat surface across said light aperture to provide a distorted image on said photosensitive sheet in the direction of travel of said sheets, said drive means being comprised of two variable speed synchronous motors connected to said first and second rollers, respectively, a source of line voltage, means for varying the frequency of said line voltage means and switch means for selectively connecting one of said motors directly to said line voltage and the other said motors to the output of said means for varying the frequency of the line voltage whereby the speed of said other motor may be varied relative to the speed of said one of said motors.

2. A device as set forth in claim 1 wherein said elongated light aperture is comprised of an elongated slot extending through the upper surface of said enclosure means, a recess in the upper surface of said enclosure means along each side of said slot, and an opaque photographic film sheet having a transparent line image thereon disposed in alignment with said slot.

3. A device as set forth in claim 2 further comprising adjustable light reflecting means disposed intermediate said light source means and said light aperture for properly focusing a collimated light beam on said aperture.

4. A device as set forth in claim 2 further comprising a transparent plate disposed in the bottom of said recess, said film sheet being disposed with the emulsion in contact with said plate to prevent the photographic emulsion from wearing off.

5. A device for producing a print from a photographic image with a predetermined change in one dimension thereof comprising a fixed frame, light source means mounted in said frame, enclosure means surrounding said frame and having a flat upper surface provided with an elongated light aperture, first and second roller means rotatably mounted in said fixed frame with the axes of rotation thereof disposed parallel to each other and to said elongated light aperture, attaching means on said roller means to which an image sheet and a photosensitive sheet may be secured, drive means for rotating said first and second roller means at different speeds to drive said sheets in superimposed relation on said flat surface across said light aperture to provide a distorted image on said photosensitive sheet in the direction of travel of said sheets, said attaching means comprising a pair of flexible, plastic, transparent sheets upon which said photosensitive sheet and said image sheet may be secured and means for securing one edge of each plastic sheet to a respective roller.

6. A device as set forth in claim 5 wherein said means for securing are comprised of a pair of radially projecting pins on each roller means, complementary apertures adjacent said one edge of each sheet and spring clip means for holding said plastic sheets on said pins.

7. A device as set forth in claim 5 further comprising a pair of superimposed, separating and guiding bars pivoted adjacent one edge of said enclosure means and extending transverse to the direction of travel of said sheets and a presser bar pivoted at one end of said enclosure means and extending parallel to said bars in overlying relation to said light aperture to press said sheets into close proximity to said aperture.

* * * * *